(12) United States Patent
Hartmann et al.

(10) Patent No.: US 10,953,891 B2
(45) Date of Patent: Mar. 23, 2021

(54) METHOD AND SYSTEM FOR PROVIDING AN OPTIMIZED CONTROL OF A COMPLEX DYNAMICAL SYSTEM

(71) Applicant: Siemens Aktiengesellschaft, Munich (DE)

(72) Inventors: Dirk Hartmann, Aßling (DE); Birgit Obst, Munich (DE); Erik Olof Johannes Wannerberg, Munich (DE)

(73) Assignee: SIEMENS AKTIENGESELLSCHAFT

( * ) Notice: Subject to any disclaimer, the term of this patent is extended or adjusted under 35 U.S.C. 154(b) by 291 days.

(21) Appl. No.: 15/963,240

(22) Filed: Apr. 26, 2018

(65) Prior Publication Data

US 2019/0031204 A1   Jan. 31, 2019

(30) Foreign Application Priority Data

May 15, 2017  (EP) ..................... 17171020

(51) Int. Cl.
*B60W 50/06* (2006.01)
*G05B 13/04* (2006.01)
(Continued)

(52) U.S. Cl.
CPC ......... *B60W 50/06* (2013.01); *G05B 13/0265* (2013.01); *G05B 13/048* (2013.01);
(Continued)

(58) Field of Classification Search
CPC .............. G05B 13/0265; G05B 13/048; G05B 2219/33037; G05B 2219/33041;
(Continued)

(56) References Cited

U.S. PATENT DOCUMENTS 6,445,963 B1   9/2002 Blevins et al.
2002/0184166 A1* 12/2002 Jackson ................... G06N 5/02
706/14
(Continued)

FOREIGN PATENT DOCUMENTS

CN      1598720 A    3/2005
CN    101055468 A   10/2007
(Continued)

OTHER PUBLICATIONS

Ramirez; "Diffusion maps for exploring electro-optical synthetic vehicle image data"; Aerospace and Electronics Conference (NAECON) 2012 IEEE National; pp. 126-133; 2012 (Year: 2012).*
(Continued)

*Primary Examiner* — Stephen Holwerda
(74) *Attorney, Agent, or Firm* — Schmeiser, Olsen & Watts LLP

(57) ABSTRACT

A method using machine learned, scenario based control heuristics including: providing a simulation model for predicting a system state vector of the dynamical system in time based on a current scenario parameter vector and a control vector; using a Model Predictive Control, MPC, algorithm to provide the control vector during a simulation of the dynamical system using the simulation model for different scenario parameter vectors and initial system state vectors; calculating a scenario parameter vector and initial system state vector a resulting optimal control value by the MPC algorithm; generating machine learned control heuristics approximating the relationship between the corresponding scenario parameter vector and the initial system state vector for the resulting optimal control value using a machine learning algorithm; and using the generated machine learned control heuristics to control the complex dynamical system modelled by the simulation model.

11 Claims, 9 Drawing Sheets

(51) Int. Cl.
  *G05D 1/02* (2020.01)
  *G06N 20/00* (2019.01)
  *G05B 13/02* (2006.01)
(52) U.S. Cl.
  CPC ........... *G05D 1/0221* (2013.01); *G06N 20/00* (2019.01); *G05B 2219/33037* (2013.01); *G05B 2219/33041* (2013.01); *G05D 2201/0213* (2013.01)
(58) Field of Classification Search
  CPC ..... B60W 50/06; G06N 20/00; G05D 1/0221; G05D 2201/0213
  See application file for complete search history.

(56) References Cited

U.S. PATENT DOCUMENTS

| | | |
|---|---|---|
| 2004/0249483 A1 | 12/2004 | Wojsznis et al. |
| 2005/0267608 A1* | 12/2005 | Nishira ............... B60K 31/0008 700/44 |
| 2006/0058899 A1 | 3/2006 | Boyden et al. |
| 2007/0244575 A1 | 10/2007 | Wojsznis et al. |
| 2012/0150324 A1 | 6/2012 | Brand |
| 2015/0131848 A1* | 5/2015 | Thirumaleshwara ........................ G06K 9/4642 382/103 |
| 2016/0147203 A1 | 5/2016 | Di Cairano et al. |
| 2016/0160787 A1 | 6/2016 | Allain et al. |
| 2016/0161950 A1 | 6/2016 | Frangou |
| 2017/0017212 A1 | 1/2017 | Collins et al. |

FOREIGN PATENT DOCUMENTS

| | | |
|---|---|---|
| CN | 104967149 A | 10/2015 |
| CN | 105259763 A | 1/2016 |
| JP | 2016100009 A | 5/2016 |
| JP | 2016520464 A | 7/2016 |
| WO | 2006026060 A1 | 3/2006 |
| WO | 2017006372 A1 | 1/2017 |

OTHER PUBLICATIONS

Sompura Jay N et al: "Experimental study: Neural network based model predictive control of a distributed parameter system", 2016 12th IEEE International Conference on Control and Automation (ICCA), IEEE, pp. 529-534, XP032919061, DOI: 10.1109/ICCA.2016.7505331 Technical Fields [retrieved on Jul. 5, 2016]; 2016.
Gautam Ajay et al: "Stabilizing model predictive control using parameter-dependent dynamic policy for nonlinear systems modeled with neural networks", Journal of Process Control, Oxford, GB, vol. 36, pp. 11-21, XP029309432, ISSN: 0959-1524, DOI: 10.1016/J.JPROCONT.2015.09.003; p. 1-p. 9; 2015.
Extended European Search Report for Application No. 17171020.5, dated Nov. 20, 2017.
English Translation of Japanese Notice of Allowance for Application No. 2018-092884, dated Jul. 2, 2019.
Xiangjun, Duan: "A study for a predictive control method based on neural networks"; Master's Essay; Mar. 15, 2006; pp. 1-68; 2006.
Yi, He: "Nonlinear system recogonization model and control based on the support vector machine"; The Identification, Modeling and Control of Nonlinear System Based on SVM; Apr. 15, 2009; pp. 1-9; 2009.
Afram, Abdul et al: "Artificial neural network (ANN) based model predictive control (MPC) and optimization of HVAC systems: A state of the art review and case study of a residential HVAC system"; Energy and Buildings; vol. 141; Feb. 11, 2017; pp. 9X 113; URL: http://dx.doi.org/10.1016/j.enbuild.2017.02.012; 2017.

* cited by examiner

METHOD AND SYSTEM FOR PROVIDING AN OPTIMIZED CONTROL OF A COMPLEX DYNAMICAL SYSTEM

CROSS-REFERENCE TO RELATED APPLICATIONS

This application claims priority to European application No. EP 17171020 having a filing date of May 15, 2017, the entire contents of which is hereby incorporated by reference.

FIELD OF TECHNOLOGY

The following relates to a system and method for providing optimized control of a complex dynamical system such as a vehicle using machine learned, scenario based control heuristics.

BACKGROUND

Systems such as plants or vehicles are becoming increasingly more complex. As a consequence, also the corresponding controls controlling the system become more complex. This leads to increasing requirements for programming and configuration of corresponding control systems. Moreover, the computational requirements have become more demanding and the necessary computation time of performing a system control does increase.

SUMMARY

An aspect relates to providing a method system for controlling a complex dynamical system which is highly efficient and requires less computational resources for performing the control of the complex dynamical system.

Embodiments of the present invention provide according to a first aspect a method for performing an optimized control of a complex dynamical system using machine learned, scenario based control heuristics. The method comprising the steps of: providing a simulation model for predicting a system state vector of said dynamical system in time based on a current scenario parameter vector and a control vector, using a Model Predictive Control, MPC, algorithm to provide the control vector at every time during a simulation of the dynamical system using said simulation model for different scenario parameter vectors and initial system state vectors, calculating for every simulated combination of scenario parameter vector and initial system state vector a resulting optimal control value by the Model Predictive Control, MPC, algorithm and saving the resulting optimal control value, generating machine learned control heuristics approximating the relationship between the corresponding scenario parameter vector and the initial system state vector for the saved resulting optimal control value using a machine learning algorithm, and using the generated machine learned control heuristics to control the complex dynamical system modelled by said simulation model.

In a possible embodiment of the method according to the first aspect of embodiments of the present invention the machine learning algorithm uses diffusion maps.

In another possible embodiment of the method according to the first aspect of embodiments of the present invention the machine learning algorithm uses diffusion maps with closed observables for approximating the dynamical system.

In another possible embodiment of the method according to the first aspect of embodiments of the present invention the machine learning algorithm uses support vector machines.

In a further possible embodiment of the method according to the first aspect of embodiments of the present invention the generated machine learned control heuristics are transferred to a controller which controls online the dynamical system according to the transferred machine learned control heuristics.

In another possible embodiment of the method according to the first aspect embodiments of the present invention the machine learned control heuristics comprise approximate rules for controlling the complex dynamical system modelled by said simulation model.

Embodiments of the present invention provide according to a further aspect a control heuristic generation platform.

Embodiments of the present invention provide according to the second aspect a control heuristic generation platform for providing machine learned control heuristics used for controlling a dynamical system modelled by a simulation model f stored in a model storage and adapted to predict a system state vector of the dynamical system in time based on a current scenario parameter vector and a control vector, wherein said control heuristic generation system comprises: a first computation unit using a model predictive control, MPC, algorithm to provide the control vector at every time during a simulation of said dynamical system using said simulation model f for different scenario parameter vectors and initial system state vectors and adapted to calculate for every simulated combination of scenario parameter vector and initial system state vector a resulting optimal control value using said Model Predictive Control, MPC, algorithm and saving the resulting optimal control value in a memory, a second computational unit adapted to generate machine learned control heuristics approximating the relationship between the corresponding scenario parameter vector and the initial system state vector for the saved resulting optimal control value using a machine learning algorithm, wherein the generated machine learned control heuristics are transferable to a controller of said dynamical system via an interface of said control heuristic generation platform.

In a possible embodiment of the control heuristic generation platform according to the second aspect of embodiments of the present invention the control heuristic generation platform is implemented as a cloud platform.

In a further possible embodiment of the control heuristic generation platform according to the second aspect of embodiments of the present invention the machine learned control heuristics comprise approximate rules for controlling the complex dynamical system modelled by said simulation model f.

In a further possible embodiment of the control heuristic generation platform according to the second aspect of embodiments of the present invention the dynamical system comprises a vehicle controlled online by a controller according to the transferred machine learned control heuristics.

BRIEF DESCRIPTION

Some of the embodiments will be described in detail, with reference to the following figures, wherein like designations denote like members, wherein.

DETAILED DESCRIPTION

Figure 1:
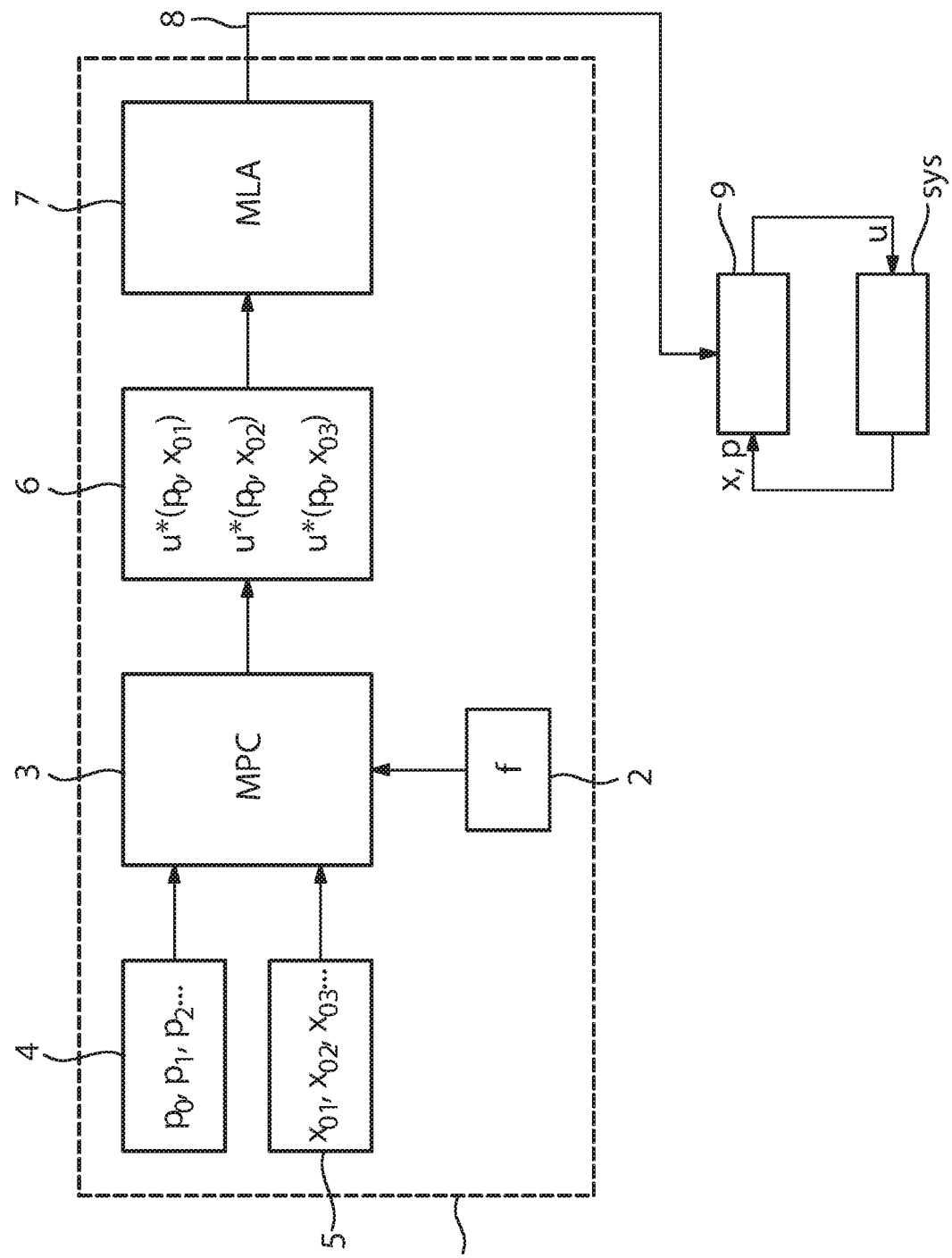
FIG. 1 shows schematically a possible exemplary embodiment of a control heuristic generation platform according to an aspect of embodiments of the present invention.

As can be seen in the exemplary embodiment of FIG. 1 a control heuristic generation platform 1 according to an aspect of embodiments of the present invention can comprise different components. The control heuristic generation platform 1 as illustrated in FIG. 1 can be used for providing machine learned control heuristics. These control heuristics are used for controlling a dynamical system sys online, which is modelled by a simulation model f and stored in model storage 2 of the control heuristic generation platform 1. The simulation model f stored in the model storage 2 is adapted to predict a system state vector x of the dynamical system sys in time based on a current scenario parameter vector p and a control vector u. The simulation model f can be an engineering model of the dynamical system sys. The dynamical system can be for instance a vehicle driving on a road. The control heuristic generation platform 1 comprises a first computation unit 3 adapted to use a model predictive control, MPC, algorithm to provide the control vector u at every time during a simulation of the dynamical system using the simulation model f for different scenario parameter vectors p and initial system state vectors $x_0$. The first computation unit 3 of the control heuristic generation platform 1 has access to a database 4 which stores scenario parameter vectors p. Further, the computation unit 3 of the control heuristic generation platform 1 has access to a further database 5 where initial system state vectors $x_0$ of the system sys are stored. The computation unit 3 is adapted to calculate for every simulated combination of scenario parameter vector p and initial system state vector $x_0$ a resulting optimal control value u* using the MPC algorithm. The resulting optimal control value u* is then saved by the computation unit 3 to a memory 6 which stores the calculated optimal control values.

The control heuristic generation platform 1 further comprises a second computation unit 7 adapted to generate machine learned control heuristics approximating a relationship between the corresponding scenario parameter vector p and the initial system state vector $x_0$ for the resulting optimal control value using a machine learning algorithm MLA. The generated machine learned control heuristics $u_a$ can be transferred in a possible embodiment to a controller 9 of the dynamical system sys via an interface of the control heuristic generation platform 1. As shown in FIG. 1 the generated machine learned control heuristics $u_a$ are after completion transferred via means 8 to the controller 9 controlling the dynamical system sys modelled by the simulation model f online. They can be transported by different means, such as electronically by cable or by a physical memory such as a USB stick. In a possible implementation the control heuristic generation platform 1 can be implemented as a remote platform, for instance as a cloud platform. The implementation as a cloud platform allows using almost unlimited computation resources in the offline, heuristic-producing phase.

Figure 2:
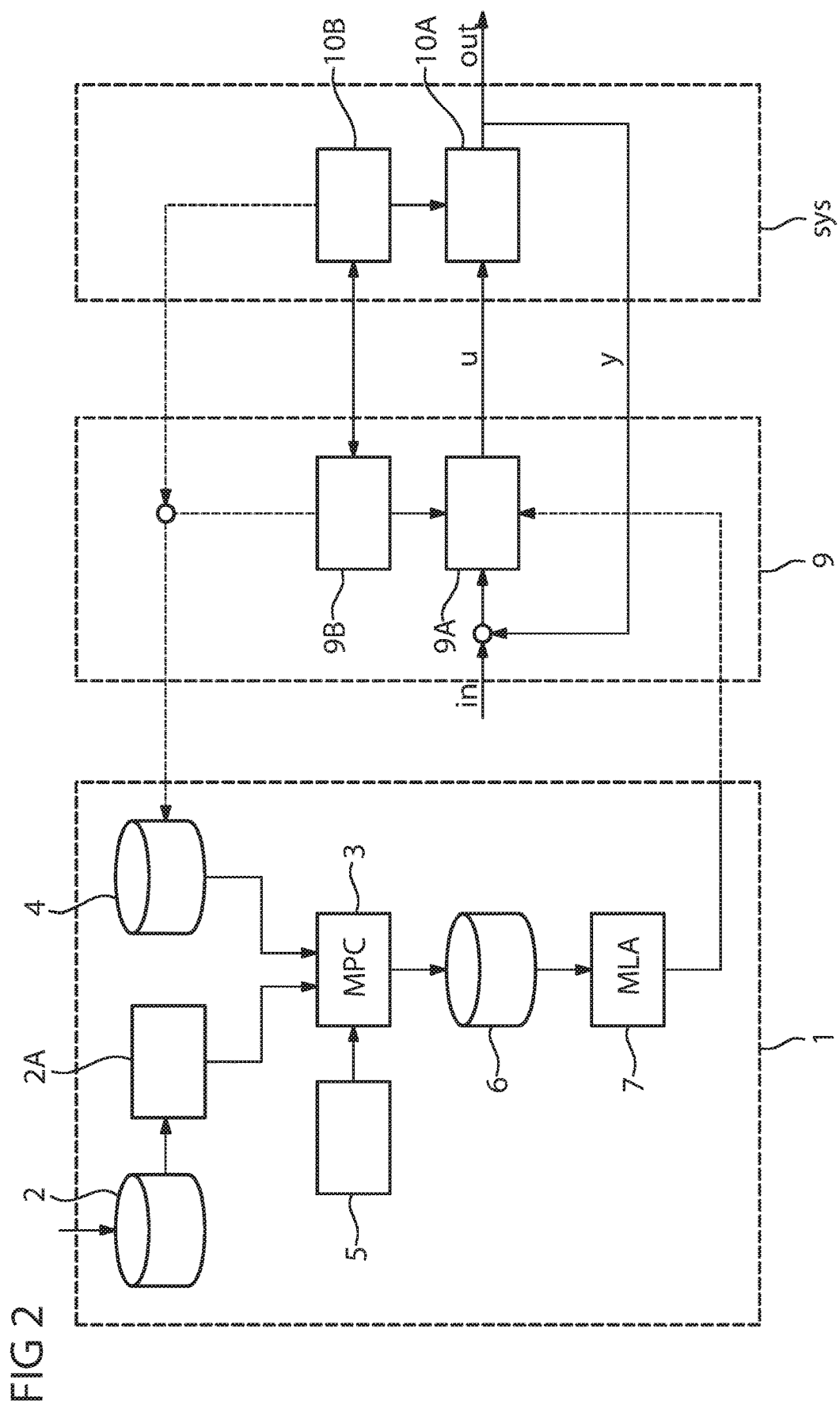
FIG. 2 shows a further schematic diagram for illustrating a possible exemplary embodiment of a control heuristic generation platform providing machine learned control heuristics used by a controller for controlling a dynamical system.

FIG. 2 shows a further diagram for illustrating the system according to embodiments of the present invention. In the illustrated embodiment of FIG. 2 the remote platform 1 comprises a storage 2 for storing the engineering model or simulation model f of the dynamical system sys. The platform 1 comprises in the illustrated embodiment a model order reduction unit 2a for reducing automatically the complexity or order of the used simulation model f. The database 4 stores a group of anticipated use cases or scenario parameter vectors, for instance historic data, previous product generations or product requirements. The computation unit 3 performs simulations using a model predictive control, MPC, to provide a control vector u. Accordingly, the computation unit 3 provides a model predictive control, MPC, for the group of anticipated scenarios. The model predictive control, MPC, algorithm is used to provide a control vector u at every time during a simulation of the dynamical system sys using the simulation model f for different scenario parameter vectors p and initial system state vectors $x_0$ read from the database 5. On every simulation combination of a scenario parameter vector p and initial system state vector $x_0$ a resulting optimal control value u* is calculated using the MPC algorithm. The resulting optimal control values u* are stored in the memory 6 of the platform 1. The second computation unit 7 of the platform 1 generates machine learned control heuristics $u_a$ approximating the relationship between the corresponding scenario parameter vector p and the initial system state vector $x_0$ for the saved resulting optimal control values u* using a machine learning algorithm MLA. Control values are learned by means of machine learning on the basis of the stored control behavior and/or control curves for instance by means of neural networks. The generated machine learned control heuristics $u_a$ can then be transferred to an internal memory 9A of the controller 9 as illustrated in FIG. 2. The control heuristic generation platform 1 performs an offline pre-processing using machine learning based on a simulation model f, a set of parameter scenarios using a model predictive control, MPC, algorithm. Accordingly, the control heuristic generation platform 1 provides a pre-processing in an offline phase, i.e. before operation of the system sys.

After the control heuristics $u_a$ have been transferred to the internal memory 9A of the controller 9 an online control phase is initiated during operation of the system sys. The system sys can include one or several processes 10A as shown in FIG. 2. A process of the system can be controlled using the control heuristics $u_a$ based on a predicted load 9B at a current state of the process as also illustrated in FIG. 2. Additional use cases or scenarios can be stored in the database 4 of the platform 1 as illustrated in FIG. 2. These additional use cases or scenarios may be gathered by saving parameter and state values during the online phase. It is also possible that an update of the simulation model f is performed on the basis of additional sensor information such as the change of parameters through degradation. A current load (current value of some scenario parameters) 10B is supplied to the process 10A of the dynamical system sys as shown in FIG. 2.

There is a feedback of scenarios learned according to the operation to the data base. This feedback improves the control significantly over time.

Based on this data,

A) Input parameters of the simulation model can be calibrated leading to better simulation models, e.g. learning how wear impacts motor properties, detecting tires with less pressure than assumed, detecting roof top boxed leading to a different aerodynamics, . . .

B) If can be determined under which loads the system, e.g. a machine is operated. In the case of a car that can be done by reading the trajectory from a map. In the case of a ship, factory or pump thin can be more complex. E.g. it can be determined for a pump what kind of oil with different viscosities is pumped through a pipeline. E.g. different viscosities can mean different loads.

A dynamical system is a system which has a state vector (x), where the state vector evolves with time t according to some function of the state, $f(x)=dx/dt$. Additionally, the function can accept some parameters in a vector p ($dx/dt=f(x, p)$). In a controllable dynamical system an additional control vector (u) represents a part of the system that can be changed directly by a controller 9 that may influence the evolution of the dynamical system ($dx/dt=f(x, u, p)$). An example of a dynamical system sys is a vehicle driving along a hilly road where the state vector entries of the state vector x can be quantities such as the height, inclination, position, velocity, acceleration of the vehicle as well as the angular velocity of the motor of the vehicle. The output vector entries can comprise the readings of speed and consumption on a dashboard of the vehicle. From these the state vector x can be inferred either directly or indirectly. The control vector entries of the control vector u can for instance indicate how much gas is supplied and how far the brake pedals are pressed down. The parameter vector entries of the parameter vector p can for instance comprise the mass, air drag and rolling resistance profiles as well as the motor torque profile of the vehicle. Further parameter vector entries can describe a height profile of the road such as tabulated values of height with a position or coefficients of some function describing the height curve.

The Model Predictive Control (MPC) is an algorithm for calculating an optimal way of controlling a controllable dynamical system sys. A Model Predictive Control (MPC) takes as an input the evolution function, the estimated state vector x at time t=0 and the parameter vector p, possibly some constraints d(x, u, p), as well as a cost function C(t, x, u, p), that shall be as low as possible, and uses an optimisation algorithm to find an optimal control u* from t=0 to $t=T_h$, that either exactly or approximately gives the lowest value of the cost function C integrated during this time period, which is called the prediction horizon, while fulfilling the constraints if possible. $T_h$ is called the prediction horizon length. This calculated optimal control u* is implemented for a time step $\Delta T_c$, where $0<\Delta T_c<T_h$, after which the optimal control u* is found again for the time from $t=\Delta T_c$ to $t=T_h+\Delta T_c$, using the new estimates of the state vector x at time $t=\Delta T_c$. This can then be repeated for the next time interval from $\Delta T_c$ to $2\Delta T_c$ and so on for as long as desired.

Figure 3:
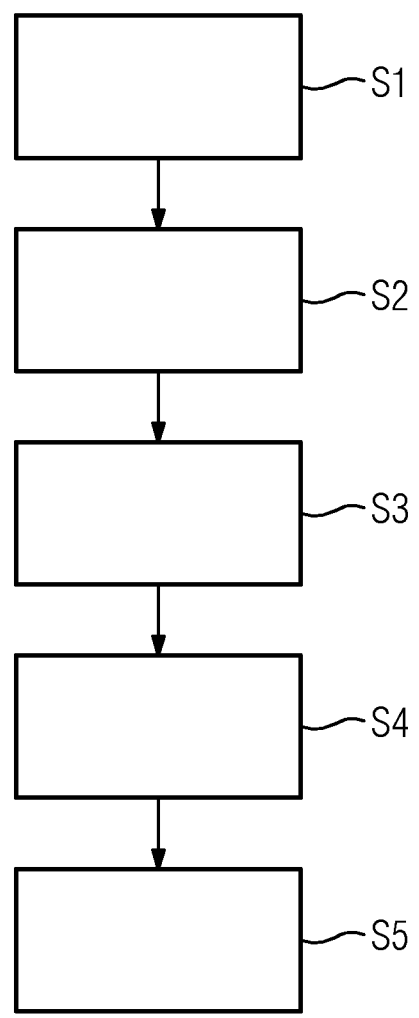
FIG. 3 shows a flow chart of a possible exemplary embodiment of a method for performing an optimized control of a complex dynamical system according to an aspect of embodiments of the present invention.

FIG. 3 shows a flow chart of a possible exemplary embodiment of a method for performing an optimized control of a complex dynamical system sys according to an aspect of embodiments of the present invention.

In a first step S1 a simulation model f is provided for predicting a system state vector x of the dynamical system in time based on a scenario parameter vector p and a control vector u.

In a further step S2 a model predictive control, MPC, algorithm is used to provide the control vector u at every time during a simulation of the dynamical system using the simulation model f for different scenario parameter vectors p and initial system state vectors $x_0$.

In a further step S3 for every simulated combination of the scenario parameter vector p and initial system state vector $x_0$ a resulting optimal control value u* is calculated by the MPC algorithm and saved to a memory.

In a further step S4 machine learned control heuristics $u_a$ are generated approximating the relationship between corresponding scenario parameter vector p and the initial system state vector $x_0$ for the saved resulting optimal control value u* using a machine learning algorithm MLA. A machine learning algorithm MLA can use for instance diffusion maps. In a possible embodiment the machine learning algorithm MLA uses diffusion maps with closed observables for approximating the dynamical system sys.

In a further step S5 the generated machine learned heuristics $u_a$ are used to control the complex dynamical system sys modelled by the simulation model f online.

The controllable dynamical system sys can be represented by a simulation model f for the dynamics of the system as follows:

$$\dot{x}=f(t,x,u,p)$$

wherein t is a time, x is a state variable vector, u is a control variable vector and p is a parameter vector.

FIGS. 4A to 4D show steps of a method according to embodiments of the present invention.

Figure 4A:
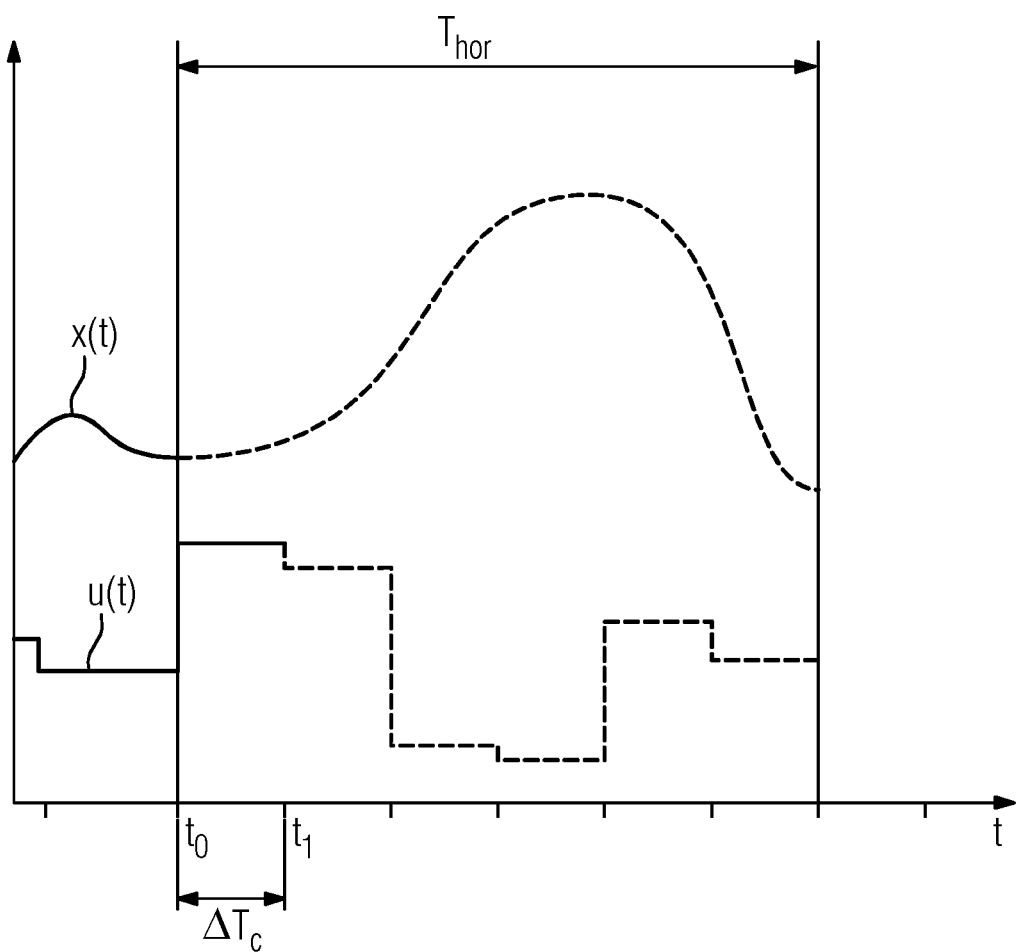
FIG. 4A, 4B, 4C, 4D show diagrams for illustrating possible exemplary embodiments for a method for performing an optimized control of a complex system according to an aspect of embodiments of the present invention.

FIG. 4A shows an MPC optimization for one-dimensional states x (t) and controls u (t). Based on known data for x and u (solid lines) and the dynamics $\dot{x}=f(x, u)$ of the system, a cost function c (not shown) is minimized for a prediction horizon $t \in [t_0, t_0+T_{hor}]$. The resulting optimal control values for u and corresponding predicted states x (dashed lines) can then be used for the next $\Delta T_c$ until $t_1$, at which point the procedure is repeated for the interval $t \in [t_0, t_0+T_{hor}]$.

Figure 4B:
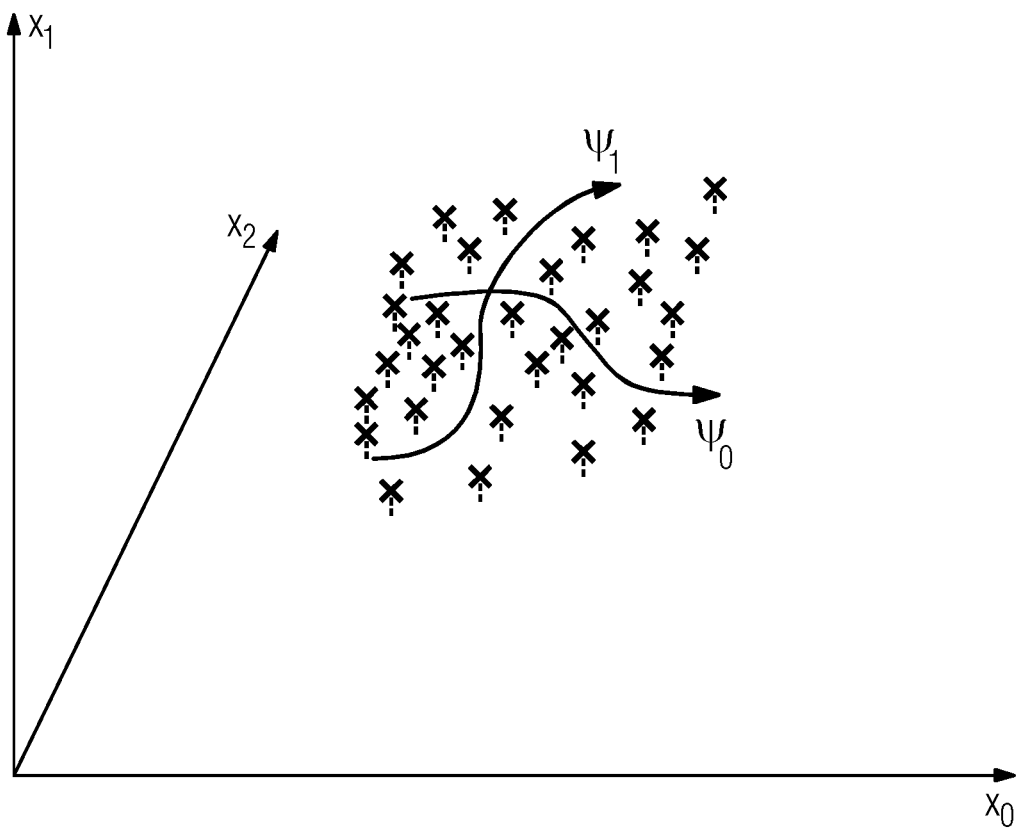

As illustrated in FIG. 4B high-dimensional MPC data is then parameterized on a lower dimensional manifold by using diffusion maps resulting in diffusion map coordinates $\psi_0$ and $\psi_1$. A diffusion map is a data analysing tool for parameterizing lower dimensional manifolds embedded in higher dimensions. Mapping according to Diffusion Maps is based upon distances between near neighbours, measured according to some kernel or metric. The idea underlying diffusion maps is that for points sampled in an underlying manifold the distance to the closest ones in the high dimensional space will approximately be the same as the distance in or along the manifold. This can be used for a type of diffusion operator between the points which in the limit of unlimited data can be made to approximate a continuous Laplace-Beltrami operator. As the eigenvectors or eigenfunctions of this operator provides useful parameterizations of the underlying manifold, it is possible to do the same for the discrete one and so to obtain a parameterization. The eigenvector values can be interpreted as coordinates in the most significant directions, or the directions that provide the most contribution to the distance within the manifold. As eigenvectors they also form an orthogonal basis of the space of functions on the data. This can also form the basis for interpolating and extending functions through geometrics harmonics.

Figure 4C:
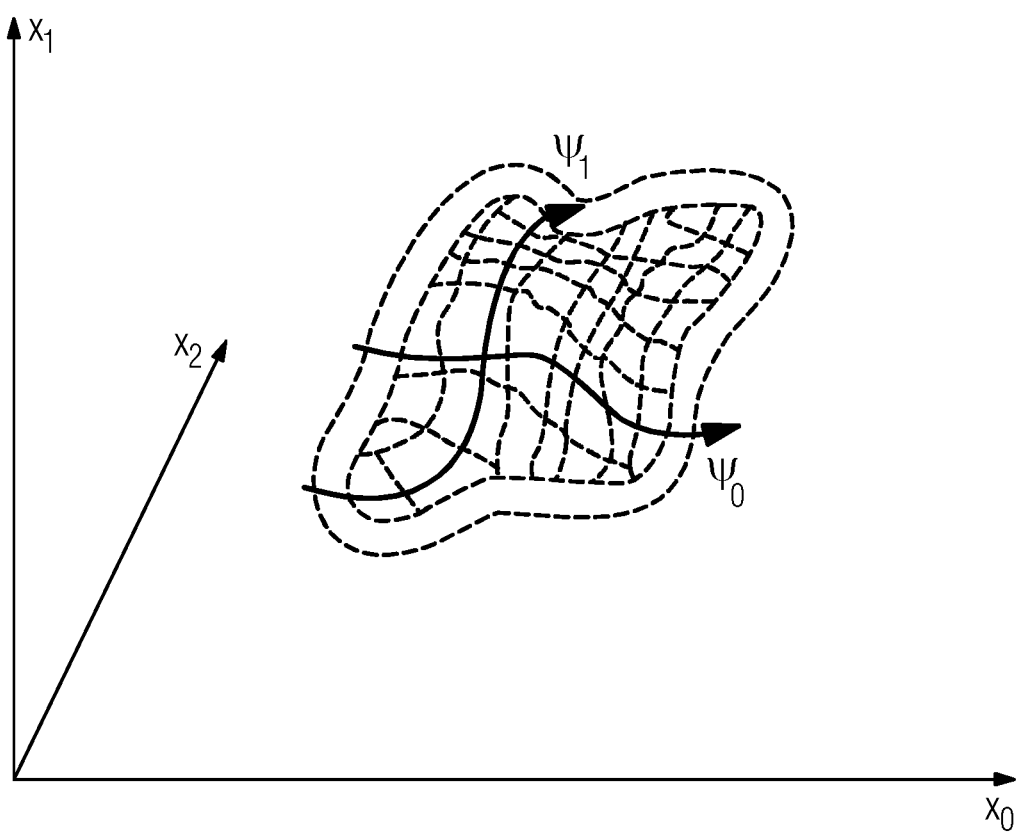

As illustrated in FIG. 4C the diffusion map's coordinates can be extended and interpolated to non-sampled points lying on or near the low-dimensional manifold approximated by the diffusion maps.

Figure 4D:
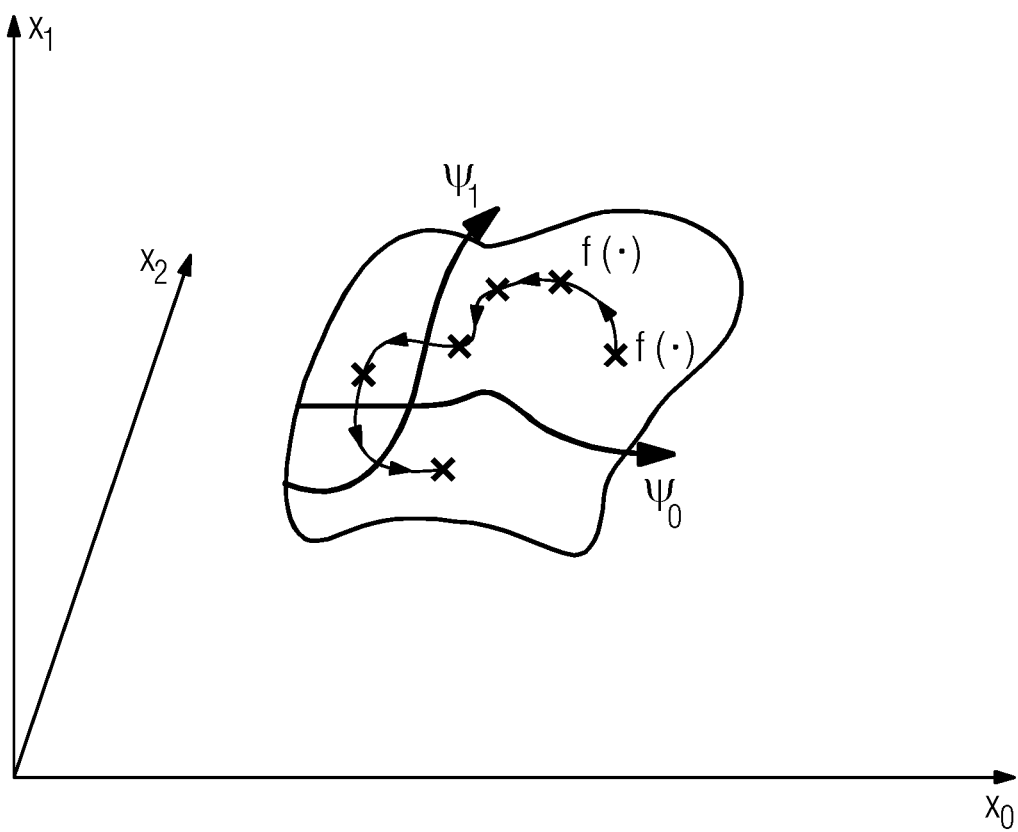

Further, as illustrated in FIG. 4D the output heuristics can be interpolated at previously unsampled points and can then be used for example for validation or control.

Another possibility of incorporating the dynamics of the system is by expanding each data point through time-delayed embedding, that is, incorporating a whole time series as one data point. This way, the distance metric compares differences between whole trajectories rather than single points in time.

In a possible embodiment the complex dynamical system comprises a vehicle driving on a road. In an application example such a system includes the energy optimized acceleration and break of the vehicle regarding a pre-provided height profile (scenario p) based on a current speed (state x).

Figure 5:
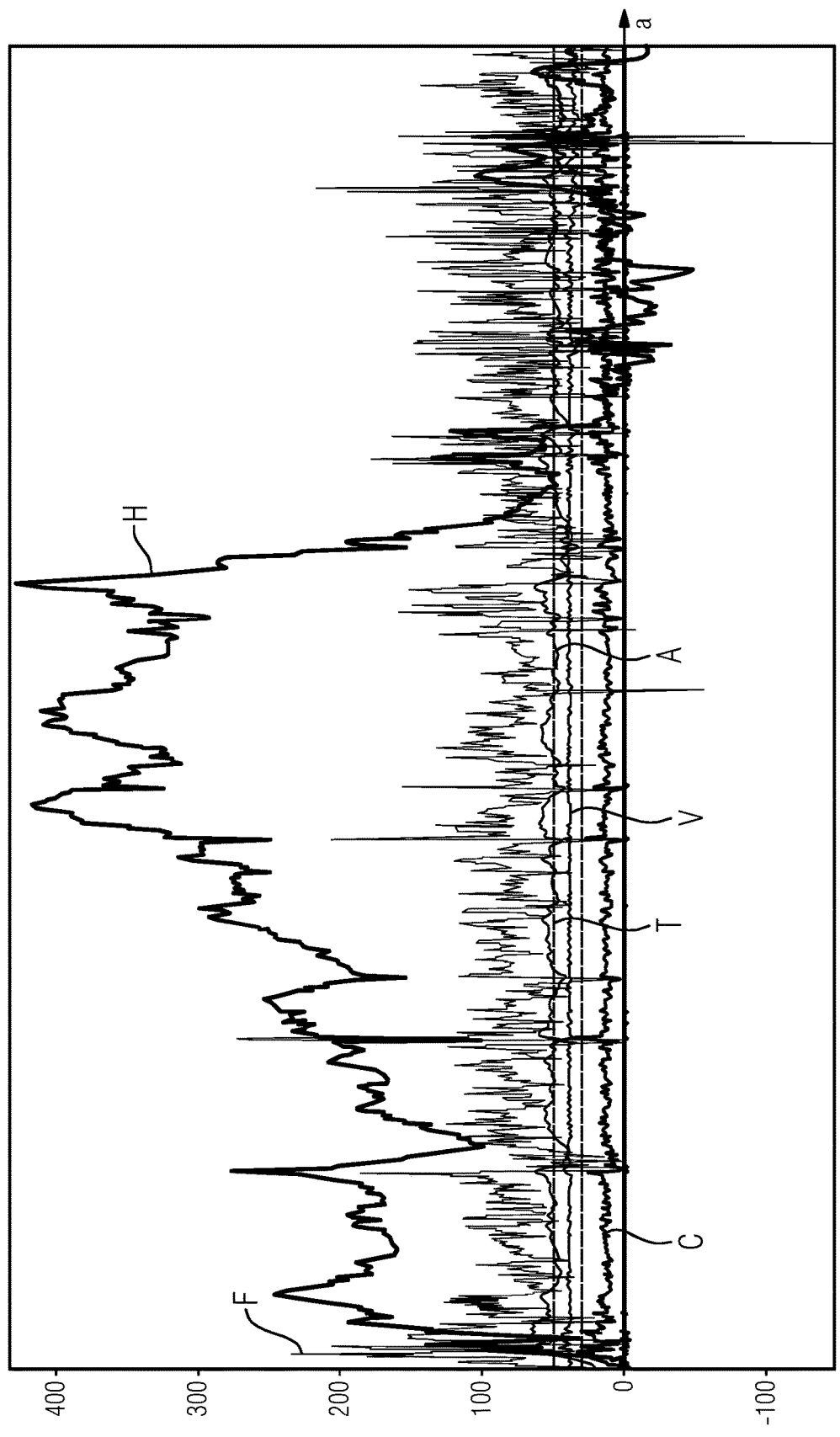
FIG. 5 shows a diagram of model predictive control results for illustrating a possible use case of the system according to embodiments of the present invention.

For example, a control heuristic can be trained by a height profile of map routes (such as those provided by Google Maps or other map services and navigation systems) as illustrated in FIG. 5. A model predictive control (MPC) algorithm can deliver the optimized control strategies or optimized control values for this height profile. FIG. 5 shows the height profile, the velocity V, acceleration A, temperature T and a motor breaking force F as well as an instantaneous cost/time value c, over a distance d.

Figure 6:
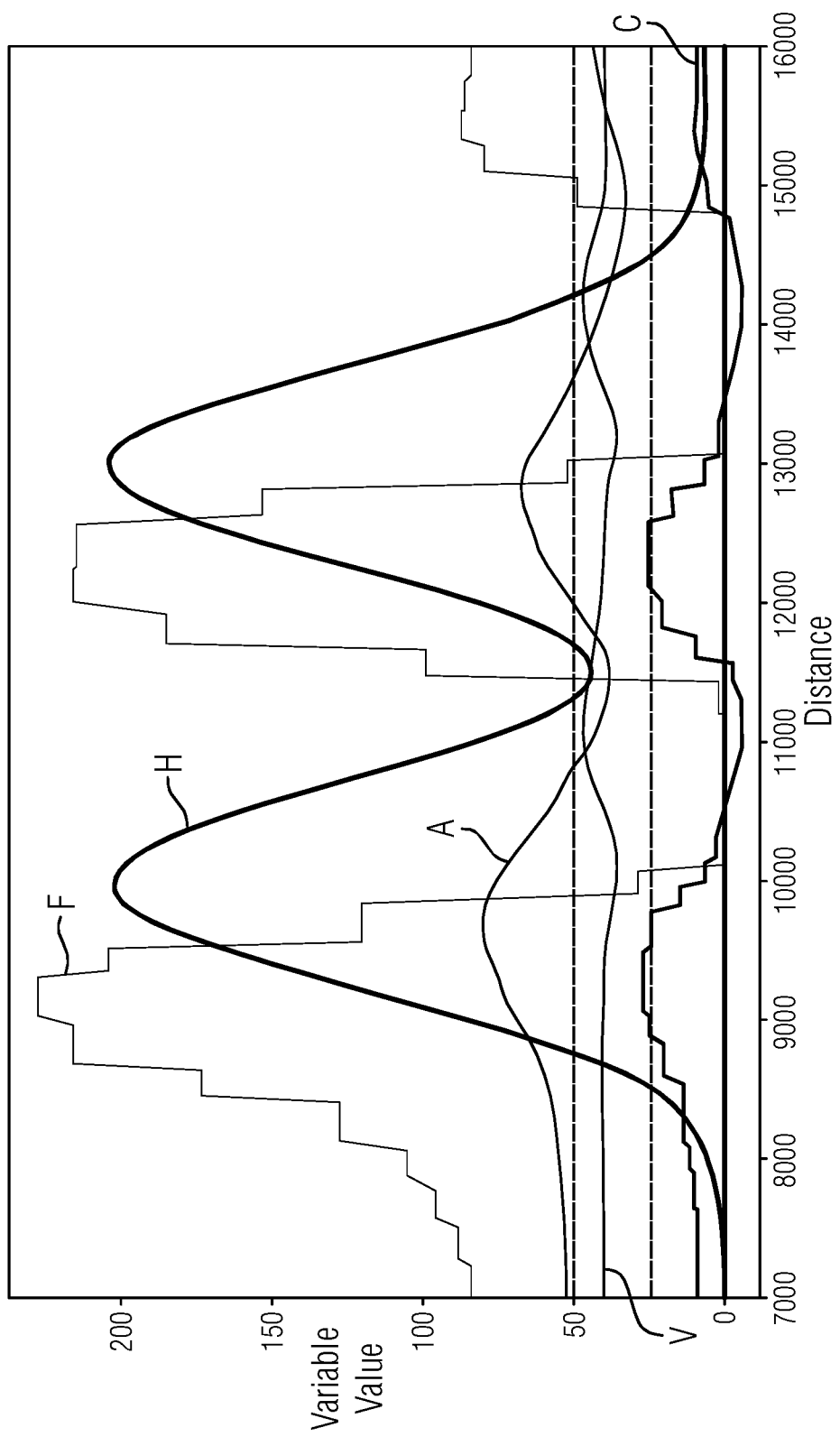
FIG. 6 shows a possible system's response for the use case of FIG. 5.

A system response with optimal control values from MPC to two successive hills made up by gaussians of a standard deviation 1000 height 200 and centres 3000 apart is shown in FIG. 6.

The control heuristic generation platform 1 comprises a database 4 for storing scenario parameter vectors. A scenario parameter vector is a vector of parameters that describe the external factors of the system. These external factors do not change because of the system's evolution. These parameters can comprise process requirements, physical constants, properties of the system or properties of a specific setting.

Further the platform 1 has access to initial system state vectors of the system. A system state vector x is a vector of variables that describe a state of the dynamical system sys and which influence the future of the dynamical system sys and that do also evolve with time. Evolution is described by a mathematical model f that depends on the system state vector x, the vector of scenario parameters p and the vector of control variables u according to $dx/dt=f(x, u, p)$. The model predictive control MPC is used to provide the control vector u at every time during a simulation of the dynamical system sys using the simulation model f for different scenario parameter vectors p and initial system state vectors $x_0$. For every simulated combination of a scenario parameter vector p and an initial system state vector $x_0$ a resulting optimal control value u* is calculated and saved in a memory 6 as shown in FIG. 1. A machine learning algorithm MLA is used to generate machine learned control heuristics $u_a$ approximating the relationship between the corresponding scenario parameter vector p and the initial system state vector $x_0$ for the saved resulting optimal control value u*. A machine learned heuristic is a heuristic (a rule of thumb or approximative rule) generated by a machine learning algorithm MLA. Machine learned heuristics comprise therefore approximate rules for control. The machine learned control heuristics $u_a$ refer to an approximative rule on the input/output relation from the input system vector x and scenario parameter vector p to the optimal control vector u generated by the model predictive control MPC algorithm. Consequently, the machine learned control heuristic $u_a$ as such is a mathematical function taking the input state vector x and the scenario parameter vector p and outputting the control vector u. Control heuristics provide a computed optimal control value. The resulting optimal control values u* can be saved and then a relationship (heuristic) can be interpolated.

In a further possible embodiment, also linear regression or nearest neighbour interpolation can be used to produce an approximate rule on variables.

The system sys itself can be controlled during operation by the controller 9 using only the generated machine learned control heuristics $u_a$. Accordingly, the computational requirements of the controller 9 itself are low. Further, the control is robust in comparison to conventional model predictive controls MPCs. Even complex processes or systems sys can be represented by simple control heuristics $u_a$ so that the efficiency of the control method is increased.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for performing an optimized control of a complex dynamical system using machine learned, scenario based control heuristics, the method comprising the steps of:
   a) providing a simulation model for predicting a system state vector of said dynamical system in time based on a current scenario parameter vector and a control vector;
   b) using a Model Predictive Control, MPC, algorithm to provide the control vector at every time during a simulation of said dynamical system using said simulation model for different scenario parameter vectors and initial system state vectors;
   c) calculating for every simulated combination of a scenario parameter vector and initial system state vector a resulting optimal control value by the MPC algorithm and saving the resulting optimal control value;
   d) generating machine learned control heuristics approximating the relationship between the corresponding scenario parameter vectors and the initial system state vectors for the saved resulting optimal control values using a machine learning algorithm; and
   e) using the generated machine learned control heuristics to control the complex dynamical system modelled by said simulation model.

2. The method according to claim 1 wherein the machine learning algorithm uses diffusion maps.

3. The method according to claim 1 wherein the machine learning algorithm uses diffusion maps with closed observables for approximating said dynamical system.

4. The method according to claim 1 wherein the machine learning algorithm uses support vector machines.

5. The method according to claim 1 wherein the generated machine learned control heuristics are transferred to a controller which controls online the dynamical system according to the transferred machine learned control heuristics.

6. The method according to claim 1 wherein the machine learned control heuristics comprise approximate rules for controlling the complex dynamical system modelled by said simulation model.

7. A control heuristic generation platform for providing machine learned control heuristics used for controlling a dynamical system modelled by a simulation model stored in a model storage and adapted to predict a system state vector of said dynamical system in time based on a current scenario parameter vector and a control vector, wherein said control heuristic generation system comprises:

a first computation unit using a model predictive control, MPC, algorithm to provide the control vector at every time during a simulation of said dynamical system using said simulation model for different scenario parameter vectors and initial system state vectors and adapted to calculate for every simulated combination of scenario parameter vector and initial system state vector a resulting optimal control value by the MPC algorithm and saving the resulting optimal control value to a memory;

a second computational unit adapted to generate machine learned control heuristics approximating the relationship between the corresponding scenario parameter vector and the initial system state vector for the saved resulting optimal control value using a machine learning algorithm, wherein the generated machine learned control heuristics are transferable to a controller of said dynamical system via an interface of said control heuristic generation platform.

8. The control heuristic generation platform according to claim 7, wherein initial system states and scenario parameter vectors observed and saved during online operation are additionally supplied to the first computational unit to construct updated machine learned control heuristics that are transferable to a controller.

9. The control heuristic generation platform according to claim 7, wherein the control heuristic generation platform is implemented as a cloud platform.

10. The control heuristic generation platform according to claim 7 wherein the machine learned control heuristics comprise approximate rules for controlling the complex dynamical system modelled by said simulation model.

11. The control heuristic generation platform according to claim 7, wherein the dynamical system comprises a vehicle controlled online by said controller according to the transferred machine learned control heuristics.

\* \* \* \* \*